United States Patent [19]
Loomis et al.
[11] 4,114,253
[45] Sep. 19, 1978

[54] APPLICATION FOR TERMINALS IN STRIP FORM

[75] Inventors: Phillip Eugene Loomis; Paul Elwood Martz; Howard Charles Phillips, all of Harrisburg, Pa.

[73] Assignee: AMP Incorporated, Harrisburg, Pa.

[21] Appl. No.: 795,825

[22] Filed: May 11, 1977

[51] Int. Cl.[2] .............................................. B23P 23/00
[52] U.S. Cl. ....................................... 29/566.2; 29/753
[58] Field of Search ................. 29/566.2, 566.1, 566.3, 29/753

[56] References Cited

U.S. PATENT DOCUMENTS 3,839,776 10/1974 Anderson et al. .............. 29/556.2 X

*Primary Examiner*—Travis S. McGehee
*Attorney, Agent, or Firm*—Frederick W. Raring

[57] ABSTRACT

Terminal applicator for crimping closed barrel terminals in strip form onto wires has a reciprocable ram, crimping dies on the ram, an anvil for supporting the terminal during crimping, and strip feeding and severing means for feeding terminals to the crimping zone. The anvil is normally in a retracted position and the strip is fed to position the leading terminal of the strip on the housing when the anvil is in its retracted position. Thereafter, the leading terminal is severed from the strip and the anvil is moved to an extended position in which it is at the crimping site. During such movement, a wire held at the crimping site is located in the terminal and upon movement of the dies towards the anvil, the terminal is crimped onto the wire.

7 Claims, 11 Drawing Figures

44
42
48
40
100
26
124
122
18
94
96
130
90
84
128
92
126
37
20
72
38
120
82
68
160
24
30
70
156
28
80
76
62
60
158
116
111
174
206
176
180
36
34
172
178
170
190
188
198
196
102
112
110
210
104
148
32
132
131
115
22
152
200

40
168
122
124
100
96
98
94
49
86
87
108
116
49
88
54
38
34
102
84
114
56
87
103
109
105
107
28
90
30
107
104
131
176
182
92
50
52
156
160
186
78
71
82
72
206
158
202
174
144
68
190
188
172
70
146
194
80
170
64
134
136
66
62
32
189
152
58
142
76
60
154
74
74
140
137
138

APPLICATION FOR TERMINALS IN STRIP FORM

BACKGROUND OF THE INVENTION

This invention relates to terminal applicators of the type which are used in conjunction with a bench press for crimping terminals in strip form onto wires. The term "terminal applicator" is commonly used to identify a device having a ram therein, crimping die and anvil means, and a strip feed for feeding terminal strip to the anvil. Terminal applicators are designed to be removably mounted in a standard bench press and a wide variety of applicator types are available for crimping the many types of terminal strip which are used. The use of terminal applicators obviates the requirement that specialized tooling for a particular terminal be mounted directly on the bench press.

Most of the terminal applicators known to the art are intended for crimping terminals of the type having open-U crimp ferrules onto wires. An open-U crimp ferrule has a crimp portion which is U-shaped in cross section and during crimping the end of the wire is simply positioned between the sidewalls of the U, usually by downward movement of the wire, and the U-shaped portion is crimped onto the wire. Closed barrel terminals, on the other hand, have closed cylindrical crimp portions and the wire must be carefully threaded into the barrel prior to crimping.

The instant invention is particularly directed to the achievement of an applicator which is intended to be used with a semi-automatic machine of the general type disclosed in Application Ser. No. 723,697 in which a wire is positioned by wire handling equipment at a predetermined location on the machine with relation to the press ram. Obviously, the use of a semi-automatic machine of the type disclosed in Application Ser. No. 723,697 requires precise location of the end of the wire and it also requires that the wire be positioned in the closed barrel terminal by the wire handling mechanisms of the machine.

In accordance with the practice of the instant invention, the applicator has a crimping anvil which is normally in a retracted position with relation to the crimping site (the location in the applicator at which the crimping operation takes place). Terminals in strip form are fed to the anvil while it is in its retracted position and the leading terminal is severed from the strip. Thereafter, the leading terminal is clamped to the anvil and the anvil is moved to the crimping site so that a wire which has previously been located at the crimping site of the lead making machine will be located in the closed barrel of the terminal. The terminal is then crimped onto the wire by the crimping dies.

It is accordingly an object of the invention to provide an improved terminal applicator. A further object is to provide a terminal applicator which is particularly intended for use with semi-automatic or automatic lead making machines. A further object is to provide an applicator which can be used to crimp closed barrel terminals onto wires in a semi-automatic or fully automatic lead making machine.

These and other objects of the invention are achieved in a preferred embodiment thereof which is briefly described in the foregoing abstract, which is described in detail below, and which is shown in the accompanying drawing in which.

Figures 1, 2, 3:
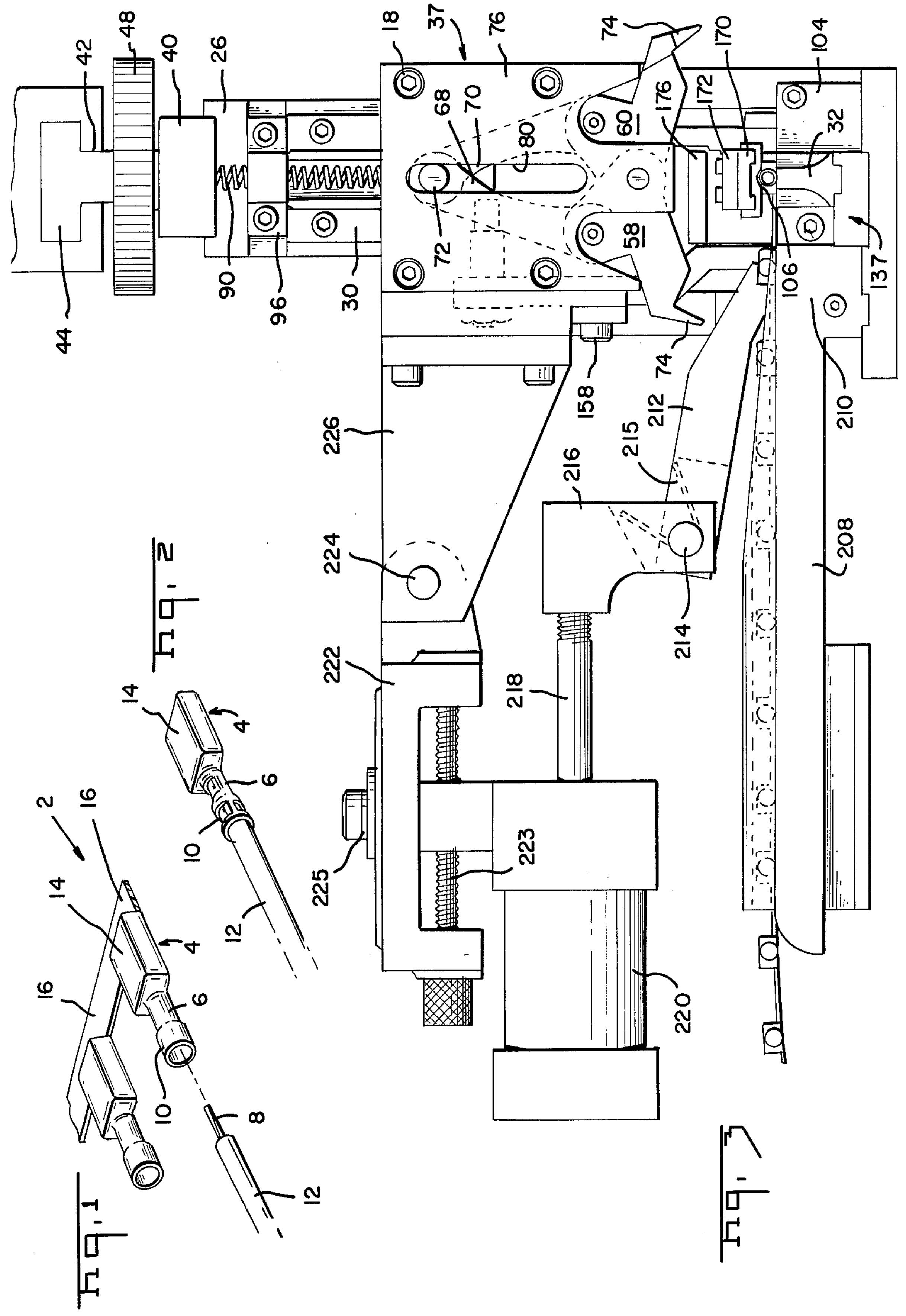
FIG. 1 is a perspective view of a short section of terminal strip of the type for which the disclosed embodiment of the invention is intended.
FIG. 2 is a perspective view of a terminal crimped onto a wire.
FIG. 3 is a frontal view of an applicator in accordance with the invention.

The herein disclosed embodiment of the invention is adapted to crimp terminals 4 onto the ends of wires which have conducting cores 8 and insulating sheaths 12. The terminals are manufactured in the form of a continuous plastic strip 2 comprising a continuous carrier strip 16 from which, at spaced intervals, plastic terminal housings extend. Each housing has a forward portion 14 which contains the receptacle or other contact portion of a metallic terminal, a wire barrel crimp portion 6, and an insulation barrel portion 10. The metallic terminal which is contained in the housing has a cylindrical wire barrel which is disposed in the crimp portion 6. The crimping operation is carried out by inserting the end of the wire into the terminal so that the stripped end 8 is in the cylindrical ferrule or crimping portion of the metallic terminal which is within the portion 6 of the housing and the end section of insulation is contained in the crimp portion 10 of the housing. As shown in FIG. 2, after the crimping operation has been carried out, the portion 6 will be crimped and the metallic ferrule of the terminal will be crimped onto the conducting core 8 of the wire. The insulation crimp portion 10 of the terminal housing will have been crimped onto the insulation 12 of the wire to provide a strain relief.

Following is a brief description of the essential sub-assemblies of an applicator 18 in accordance with the invention and this brief description is followed by a detailed description of these same sub-assemblies under the headings indicated.

Figure 6:
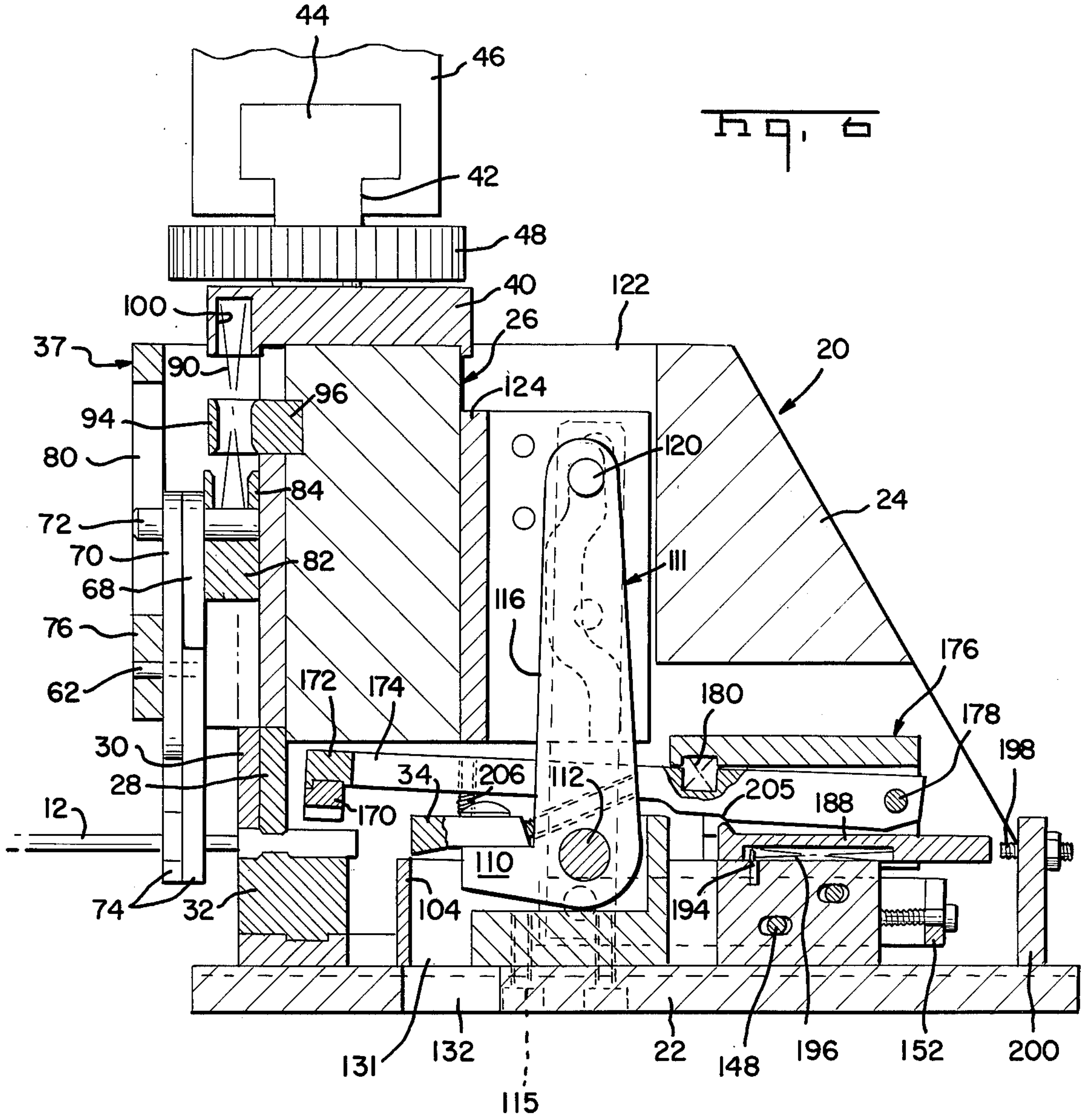

The applicator 18 comprises a frame 20 having a base 22 which is clamped to a press platen and an upstanding housing portion 24 in which a receptacle ram assembly 26 is slidably contained. The ram assembly has crimping dies 28, 30 secured thereto for crimping the wire barrel portion 6 and insulation crimp portion 10 of the terminal respectively. During crimping, the terminal is supported on the upper surface of an anvil 32 as shown in FIG. 6. The anvil's normal position, however, is retracted from the crimping site so that it is located rightwardly as viewed in FIG. 4 from the crimping site. The terminal strip 2 is fed to position the leading terminal of the strip on the anvil when it is in its retracted position and the leading terminal is severed from the strip by a means 34 prior to movement of the anvil to the position of FIG. 6. After crimping, the anvil is returned to its retracted position (FIG. 4) in preparation for the next operating cycle. It is desirable to provide a wire gripping assembly 37 to grip the end portion of the wire during the crimping operation, the gripping assembly being shown in its open position in FIG. 4 and in its closed position in FIG. 6.

RAM ASSEMBLY 26

Figure 4:
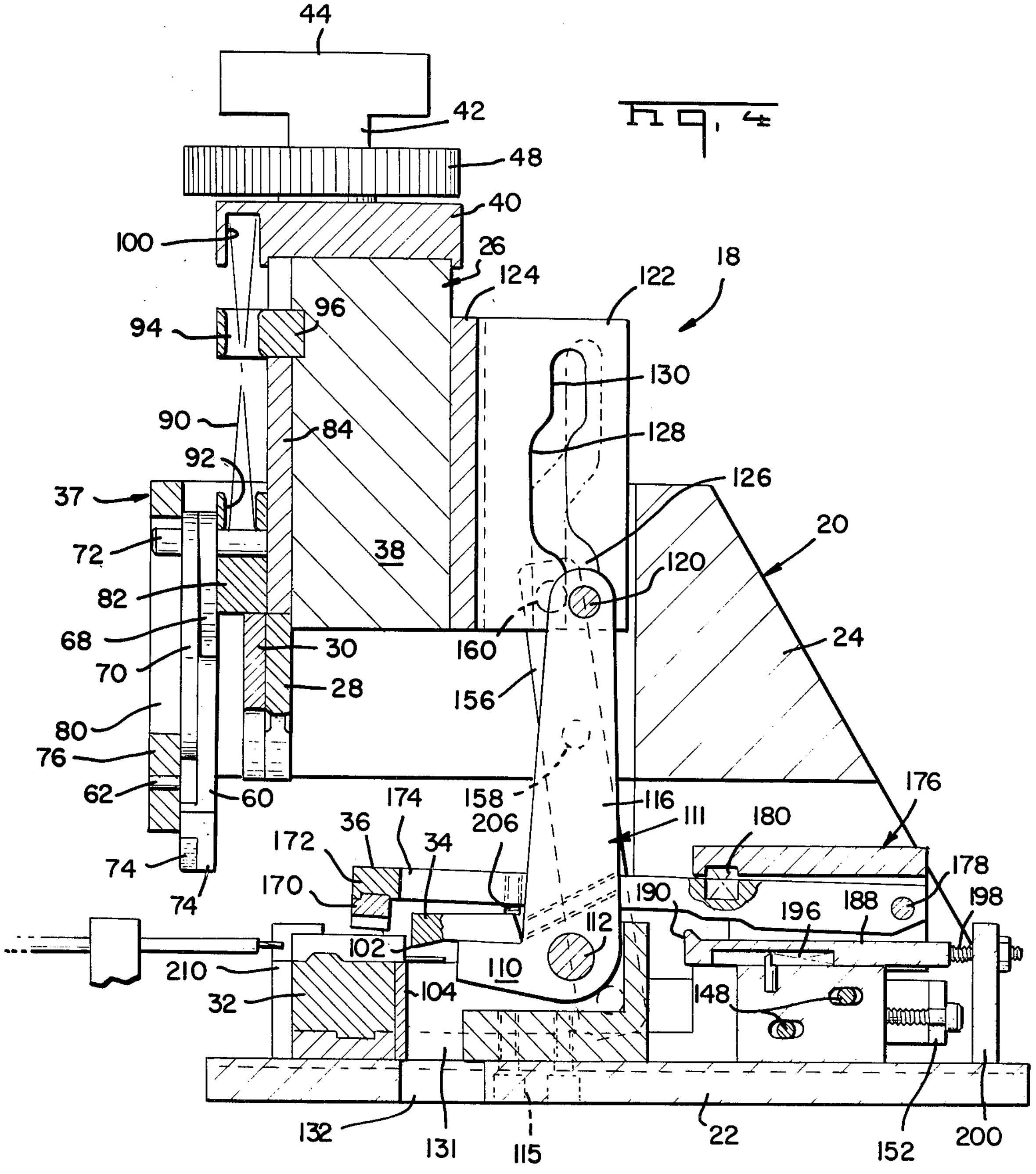
FIG. 4 is a view taken along the lines 4—4 of FIG. 3, this view showing the positions of the parts prior to the initiation of a crimping cycle.
Figure 7:
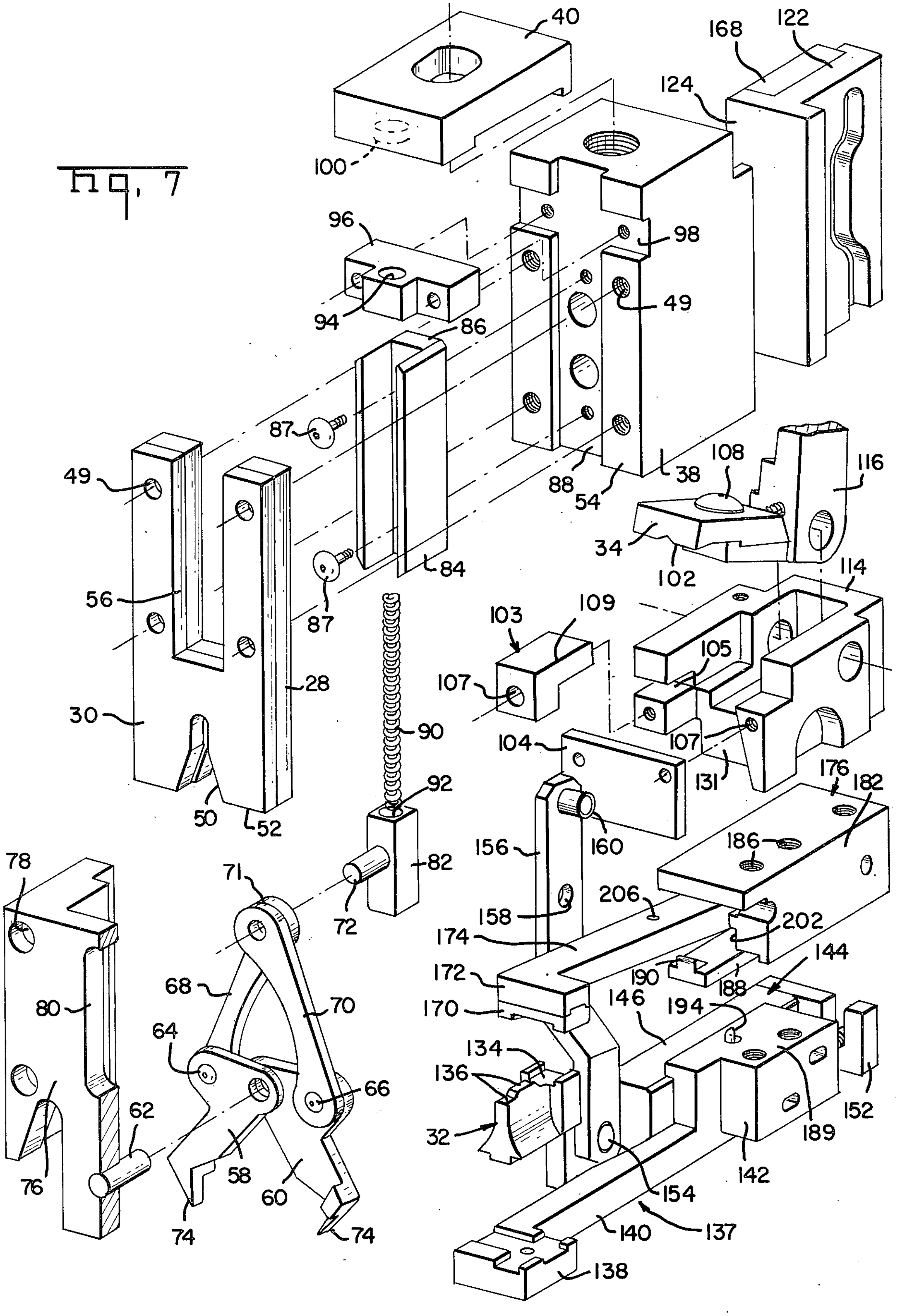
FIG. 7 is a perspective exploded view showing some of the principle elements of the applicator, particularly the ram assembly and the anvil shifting mechanisms.
Figure 8:
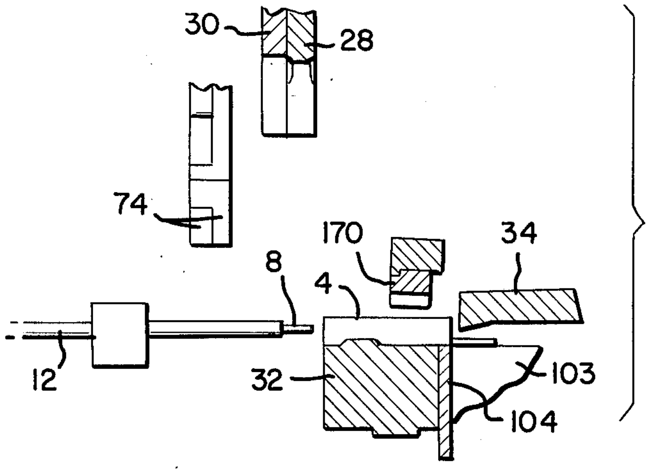
FIGS. 8–11 are a series of fragmentary views which illustrate the operation of the applicator.
Figure 9:
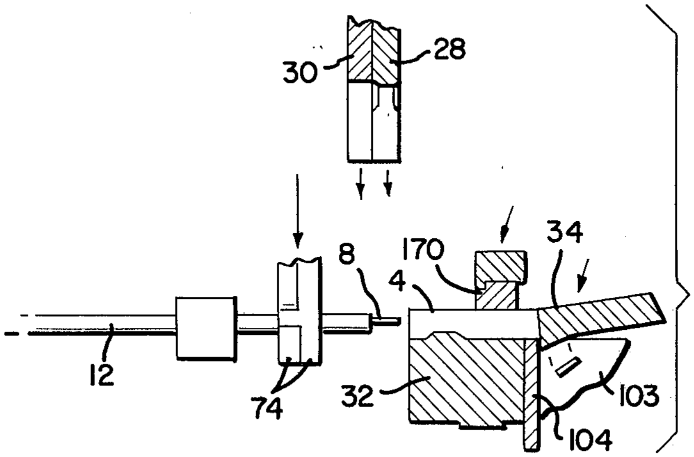
Figure 10:
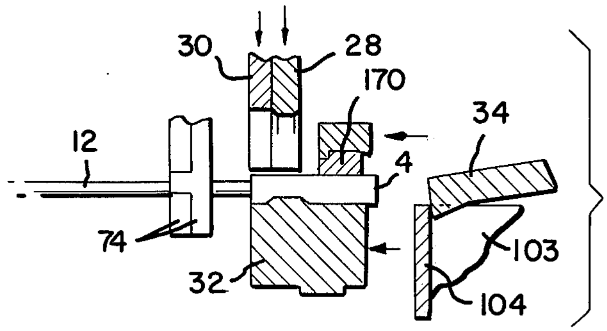
Figure 11:
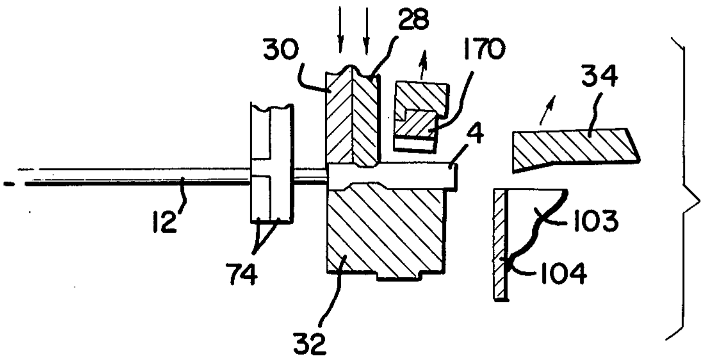

Referring now to FIGS. 4 and 7, the ram assembly comprises a main ram block 38 which is slidably contained for vertical reciprocation in the housing portion 24 of the frame. This main ram block is generally rectangular and has a cap plate 40 on its upper end through which a coupling member 42 extends. This coupling member has an enlarged upper end 44 by means of which it is coupled to the ram 46 of the bench press in which the applicator is mounted. A conventional crimp height adjustment dial 48 is provided to permit precise adjustment of the shut height of the applicator in order to control the crimping process.

The crimping dies 28, 30 are secured by fastening means 49 to the face 54 of the ram block 38 and the lower ends 52 of the dies for upwardly extending recesses 50 which move relatively over and against the crimp portions 6, 10 of the terminal during crimping. The dies have a central opening 56 to provide clearance for a guide block 86 which is described below.

The wire gripping means 37 comprises a pair of bell-crank type levers 58, 60 which overlap at their upper ends as viewed in FIG. 7 and which are pivoted on a common pivot pin 62 which extends from the internal surface of a fixed cover plate 76. The lower ends of the gripping levers 58, 60 are contoured as shown at 74 to clamp a wire when these lower ends move towards each other and the outer portions of the upper ends are pivoted at 64 and 66 to links 68, 70. These links extend towards each other and have upper ends 71 which are pivotally mounted on a common pivot pin 72 which extends from a slide block 82. The cover plate 76 is secured to the press frame 20 by fasteners which extend through openings 78 so that this cover plate does not move with the applicator ram. A central slot 80 is provided in the cover plate to provide clearance for the pin 72 on which the levers 68, 70 are mounted.

Slide block 82 is contained between the sidewalls 84 of the U-shaped guide block 86. These sidewalls extend into the opening 56 in the dies 28, 30 and the slide block is positioned in a central recess 88 in the main ram block and secured to this block by fasteners 87.

Slide block 82 is biased downwardly as viewed in the drawing by a spring 90 which is received in an opening in the upper end of the slide block and which extends upwardly through an opening 94 in a fixed guide block 96. The upper end of spring 90 is disposed in an opening 100 in the downwardly facing surface of the cap plate 46. The guide block 96 is secured to the ram block 38 by suitable fasteners in a transversely extending recess 98, FIG. 7.

Figure 5:
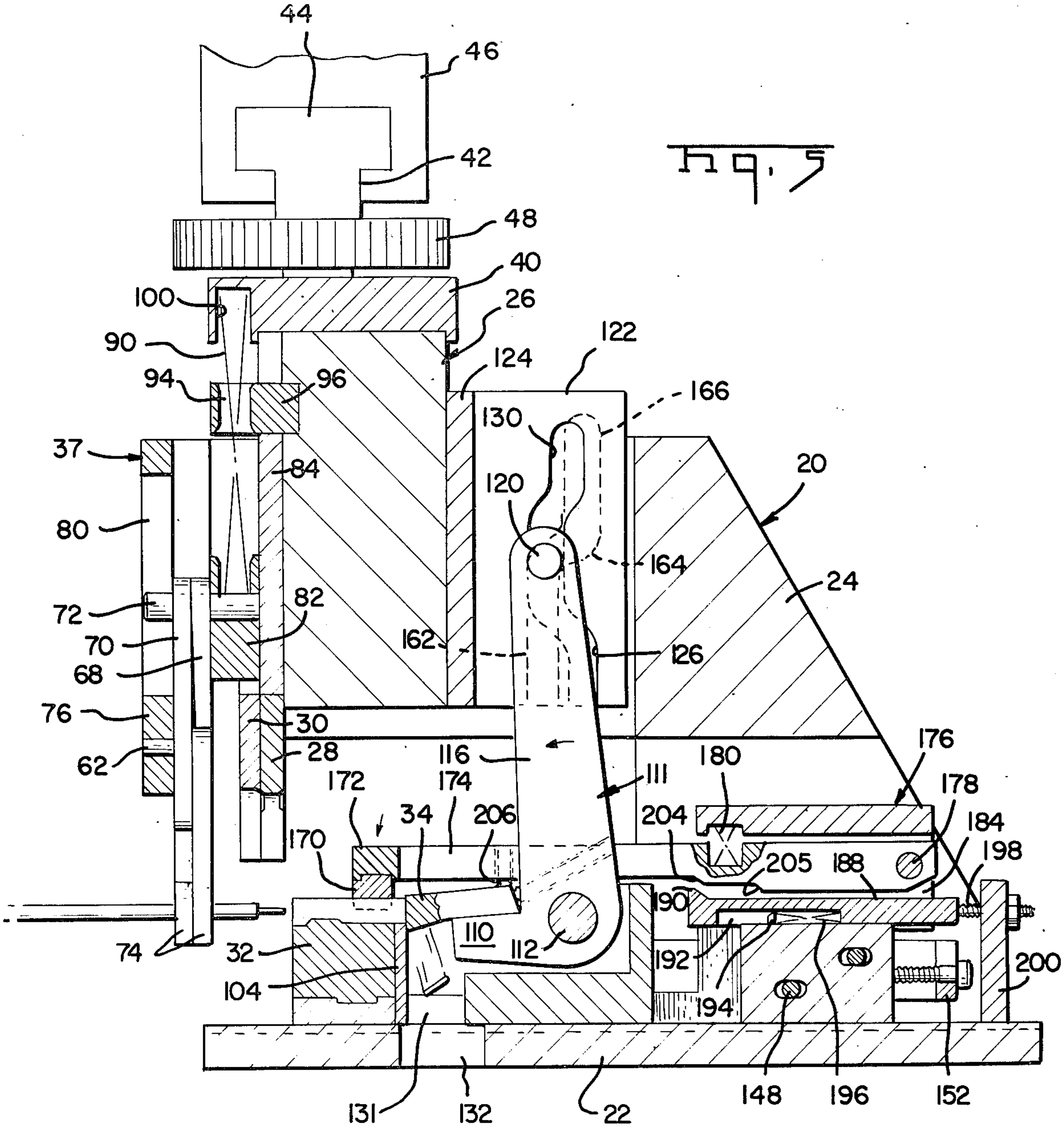
FIGS. 5 and 6 are views similar to FIG. 4 but showing the positions of the parts at a point midway through the downward stroke of the applicator ram (FIG. 5) and at the bottom dead center position of the ram (FIG. 6).

It will be apparent from an inspection of FIG. 4–6 that during downward movement of the ram assembly 26, the pin 72 will move downwardly thereby to cause the levers or gripping arms 58, 60 to pivot towards each other until they clampingly engage the end portion of the wire as shown in FIG. 5. Clamping of the wire takes place during the initial portion of the downward stroke of the ram assembly 26 and during the remainder of the downward stroke the spring 90 is compressed as shown in FIG. 6 while the slide block 82 remains substantially stationary.

STRIP SHEARING MECHANISM

The leading terminal 4 which has been fed to the surface 134, 136 of the anvil 32 is sheared from the strip and the strip is cut transversely by movable shearing edges 102, 106 of the movable shearing block 34 as this block moves arcuately downwardly from the position of FIG. 4 to the position of FIG. 5. The shearing edges 102, 106 cooperate with fixed shearing edges on a terminal shearing plate 104 and a strip shearing plate 103. Plate 103 is generally L-shaped and has a horizontally extending portion along which the fixed shearing edge 109 is provided. This horizontally extending portion extends into a recess 105 in the face of a mounting block 114. The depending portion of the block 103 is disposed behind the fixed shearing plate 104 which is also secured to the face of the mounting block 114, the same fasteners 107 being used to secure both of the shearing blocks to the face of the mounting block 114. It will be noted that the left hand side of the face of this mounting block 114 (as viewed in FIG. 7) is recessed from the right hand side thereof to accommodate the thickness of the depending portion of fixed shearing block 103. The block 114 is secured by fasteners 115 to the base plate 22 of the frame.

Movable shearing block 34 is secured by a fastener 108 to the forwardly extending foot portion 110 of an L-shaped lever 111 which is pivoted at 112 in a recess in the block 114. The upwardly extending arm 116 of the lever 111 has a cam follower 120 on its end which is received in a cam track in the surface of a camming plate 122. This camming plate has a mounting portion 124 by means of which it is secured to the rightwardly extending surface (FIG. 4) of the ram block 38 so that the cam plate 122 moves downwardly with the ram. The cam track has offset portions 126, 128, 130 which control the movement of the lever 111; when the ram is in its raised position, FIG. 4, cam follower 120 is in the lower most portion 126 of the cam track and the arm 110 and movable shearing plate 34 are above the surface of the previously fed strip 16. During downward movement of the ram 26, the lever 111 is swung through a slight counterclockwise arc as the follower moves into the portion 128 of the cam track and shearing of the terminal 4 from the strip and shearing of the strip 16 transversely of its length takes place. The short section of scrap carrier strip produced falls through a recess 13 in the block 114 and through an opening 132 in the base plate portion 22 of the frame. As the ram approaches its bottom dead center position, follower 120 moves into the portion 130 of the cam track and the lever 111 is swung through a slight clockwise arc thereby to raise the movable shear block 34 for reasons which will be discussed below.

ANVIL SHIFTING MECHANISM

The anvil 32 has upper supporting surface portions 134, 136, the portion 134 being relatively wide and being dimensioned to receive the relatively wide housing portion 14 of the terminal while the surface portions 136 are dimensioned to support the crimp portions 6, 10 during crimping. The sides of the anvil block on each side of the surface portions 136 are relieved to provide clearance for the crimping dies. The anvil block 32 is mounted on a slide assembly 137 having at its forward end an integral support block 1386 to which the anvil block 32 is secured, an elongated arm 140 which extends rearwardly and is integral with a slide block 142. The slide block has an L-shaped adjusting member 144 rigidly, but adjustably, secured thereto by means of pins 148 which extend through the forwardly extending arm 146 of the adjusting block 144 and into oversized slots in the slide block 142. The transversely extending arm portion 152 of the adjusting member 144 is spaced from the rightwardly facing surface, as viewed in FIG. 4, of the block 142 and a set screw 150 extends through a slot in the adjusting block 144 and is threaded into the block 142. This arrangement permits precise adjustment of the location of the anvil 138 so that its exact location at the end of it forward stroke can be fixed.

The slide assembly 137 is shifted between its retracted position, FIG. 4, and its forward position, FIG. 6, by a lever 156 which has its lower end pivoted at 154 to the forward end portion of the forwardly extending arm 146 of the adjusting member 144. This lever is offset intermediate its ends so that it will clear the hold down arm 172 described below and is pivoted at 158 on a stub shaft on the left hand side of the frame as viewed in FIG. 3. The upper end of the lever 156 is provided with a cam follower 160 which is received in a cam track in the surface of a cam plate 168 which is secured to the previously identified cam plate 122. The cam track has lower, intermediate, and upper portions 162, 164, and 166 respectively which cause the lever 156 to be swung through a slight clockwise arc as viewed in FIG. 4 during descent of the ram. It will be apparent from the shape of this cam track that the lever 154 completes this pivotal movement prior to arrival of the ram at its bottom dead center position so that the anvil block arrives at the crimping site prior to bottoming of the crimping dies. During return of the ram to its top dead center position (FIG. 4) the anvil block is returned to its retracted position.

TERMINAL CLAMP

It is desirable to clamp the severed leading terminal 4 to the upper surface of the anvil block 32 during movement of the anvil block from its retracted position of FIG. 4 to its forward position. This clamping means releases the terminal at the time of crimping, FIG. 6, to permit the slight movement thereof which takes place when the crimp portions 6, 10 are crimped onto the wire.

The clamping means 36 comprises a clamping block 170 having a downwardly facing surface which is contoured to straddle the housing portion 14 of the terminal supported on the anvil. Clamping block 170 is secured to the laterally extending end portion 172 of a clamping arm 174 which extends rearwardly past the offset portion of the lever 156 and into the interior of a clamping arm housing 176. This housing has depending sidewalls 182, 184 which straddle the block 142 and the adjusting member 146 of the slide assembly 147. Housing 176 is secured to the block 142 by fasteners which extend through openings 186 and this housing has a hollow interior for the accommodation of the clamping arm 174 and a camming slide 188 described below.

The clamping arm is pivotally mounted in the housing at 178 and a biasing spring 180 is provided to bias the arm downwardly to the position shown in FIG. 5, this biasing spring having its ends received in a recess in the arm and a recess in the interior surface of the housing 176. Prior to the initiation of an operating cycle, the clamping arm is maintained in a raised condition against the force of the biasing spring 180 by a set screw 206 which is threaded through the arm 174 and which bears against the upwardly facing surface of the shear block 34. However, when the shearing lever 111 is swung through a counterclockwise arc from the position of FIG. 4 to the position of FIG. 5, the arm 174 moves downwardly under the influence of spring 180 and clamps the severed terminal 4 against the surface of the anvil block.

As mentioned above, it is desirable to release or unclamp the terminal immediately prior to crimping and to this end, a camming block 188 is slidably supported on the upper surface 189 of the block 142. The left hand end of the block 188 has an upwardly projecting tooth 190 which is designed to cooperate with contoured portions 204 on the underside of the arm 174, the arrangement being such that upon relative leftward movement of the housing 176 with respect to the camming slide 188, the tooth 190 will raise the clamping arm 174 as shown in FIG. 6.

Camming slide 188 has a recess 192 extending into its underside which receives a pin 194 which is mounted in the surface 189 of the block 142. A spring 196 is contained between this pin in the right hand end of the recess 192 so that the camming slide 188 is biased rightwardly by the spring as viewed in FIG. 5. The limit of rightward movement of slide 188 is determined by a set screw 198 which is threaded through a fixed support bracket 200 secured to the base plate 22 of the applicator frame. The slide 188 is guided in its movement on the upper surface 189 of block 142 by guide ways 202 provided in the opposed depending sidewalls 182, 184 of housing 176.

The operation of the clamping means is as follows. Prior to the initiation of the operating cycle, the slide 188 will be stopped against the screw 198 by the biasing spring 196 so that the tooth 190 will be located beyond (leftwardly of) the contoured surface portions 204 of the arm 174. However, the arm will be maintained in its raised position by the set screw 206 which bears against the surface of the shearing plate 34. During initial downward movement of the ram, the lever 111 swings through a slight counterclockwise arc and the movable shear plate 34 moves away from the set screw 206 so that the biasing spring 180 causes the arm 174 to move downwardly and clamp the terminal against the anvil, see FIG. 5. Upon leftward movement of the anvil slide assembly from the position of FIG. 5 to the position of FIG. 6, the biasing spring 196 causes the slide 188 to remain stationary until the pin 194 moves against the left hand end of the recess 192 in the slide 188. During such movement of block 142, the ramp 205 on the underside of arm 172 comes to rest against tooth 190 so that slide 188 and assembly 137 moved leftwardly as a unit as viewed in FIG. 5 and slide 188 moves away from set screw 198. The assembly 137 including the slide 188 move to the crimping site with the terminal still clamped against the anvil. As the ram approaches its bottom dead center position, lever 116 is moved through a slight clockwise arc causing shear block 34 to move arcuately upwardly. During such movement of the shear block 134, it engages set screw 206 thereby raising clamping arm 174. When arm 174 moves upwardly, tooth 190 and slide 188 move relatively rightwardly with respect to the underside of arm 174. This movement of slide 188 relative to the upper surface of block 142 is brought about by spring 196.

The arm 174 is maintained in its raised position during the return stroke of the ram and of the slide assembly 137 by the tooth 190 which, at this stage of the operating cycle, is bearing against the underside of the right hand portion of the arm 174. During the final portion of the return stroke of the slide assembly 137, the camming slide 188 moves against the end of set screw 198 and the parts are returned to their positions shown in FIG. 4. During this final portion of the return stroke of slide assembly 137, clamping arm 174 is held in its raised position by shearing blade 34 and set screw 206.

TERMINAL FEED

The terminal strip 2 is fed at the end of each operating cycle a distance equal to the pitch of the strip to position the leading terminal 4 of the strip on the anvil. The feed mechanism 23, comprises a feed platform 208 having a mounting block 210 on its right hand end by means of which it is secured to its base plate portion 22 of the applicator frame. The strip is fed by a feed finger 212 which is pivotally mounted at 214 on a mounting head 216 which is secured to the end of a piston rod 218, a torsion spring 215 being provided to bias the feed finger in a clockwise direction as viewed in FIG. 3. Piston rod 218 extends from a pneumatic piston-cylinder which is adjustably supported in a mounting bracket 222 by a supporting member 220. The supporting member is slidably mounted in the mounting bracket 222, and an adjusting screw 223 is threaded through the supporting member and is received in the mounting bracket so that the precise limits of the stroke of the feed finger can be changed by means of the adjusting screw. A clamping screw is threaded into the bracket 220 so that the piston cylinder can be firmly clamped in the desired position of adjustment. Bracket 220 is rigidly secured at 225 to a mounting flange 226 which is bolted to the left hand side of the applicator as shown.

In use, the parts will be in the position of FIG. 4 prior to the beginning of an operating cycle. After the lead making machine has positioned the wire at the clamping site as shown in FIG. 4, the applicator is provoked to carry out its cycle by any suitable means such as a switch which closed during the cycle of the lead making machine. During each cycle, the ram moves from its top dead center position, FIG. 4, to its bottom dead center position, FIG. 6, and during such movement of the ram, the previously fed terminal is severed from the strip and clamped to the anvil by the clamping arm 174. The anvil is moved to its forward position, the clamping arm releases the terminal, and the terminal is crimped onto the wire. The parts are then returned to their initial positions upon upward movement of the ram.

What is claimed is:

1. An applicator for crimping terminals onto the ends of wires, said applicator being intended to be mounted in a bench press or the like, said applicator comprising:

frame means, a crimping site in said frame means, a ram in said frame means, crimping die means on said ram, said ram being reciprocable along a first path towards and away from said crimping site, an anvil in said frame means, said anvil being receiprocable along a second path towards and away from said crimping site, said second path extending transversely of said first path, actuating means for moving said anvil and said ram along said paths, said actuating means having timing means for ensuring arrival of said anvil at said crimping site prior to arrival of said crimping die at said crimping site, terminal strip feeding means for feeding a strip of said terminals to said anvil and positioning the leading terminal of said strip on said anvil when said anvil is remote from said crimping site, and shearing means for shearing said leading terminal from said strip prior to movement of said anvil towards said crimping site whereby, upon positioning the end portion of a wire at said crimping site with the axis of said wire extending in the same direction as said second path, and upon positioning a terminal on said anvil, and upon provoking said actuating means, said terminal and anvil are moved to said crimping site and said wire is positioned in said terminal, and said terminal is thereafter crimped onto said wire upon arrival of said crimping die means at said crimping site.

2. An applicator as set forth in claim 1, said applicator having closable wire clamping means adjacent to said crimping site, said actuating means having means for closing said clamping means into clamping engagement with said wire prior to arrival of said anvil at said crimping site.

3. An applicator for crimping terminals onto the ends of wires, said applicator being intended to be mounted on a bench press or the like, said applicator comprising:

frame means, a crimping site in said frame means, a ram contained in said frame means, guide means for guiding said ram along a first path of reciprocation from a retracted position to an extended position, said ram having a leading end and having a movable crimping die on said leading end, said crimping die being located at said crimping site when said ram is in said extended position, an anvil for supporting a terminal during crimping thereof, said anvil being slidably mounted on said frame means for reciprocatory movement along a second path between an extended position and a retracted position, said anvil being at said crimping site when in said extended position and being located at a terminal loading site when in said retracted position and, actuating means for moving said anvil from said retracted position to said extended position and for concomitantly moving said ram from said retracted position to said extended position, said actuating means including timing means which ensures arrival of said anvil means at said crimping site prior to arrival of said crimping die at said crimping site, terminal strip feeding means for feeding a strip of said terminals to said anvil, when said anvil is in said retracted position at said terminal loading site thereby to position the leading terminal of said strip on said anvil, and shearing means for shearing said leading terminal from said strip prior to movement of said anvil to said crimping site whereby, upon locating the end portion of a wire in said applicator with said end portion substantially at said crimping site and with the axis of said wire extending parallel to said second path, and upon loading a terminal on said anvil, and upon movement of said ram and said anvil towards said crimping site, said wire will be positioned in said terminal and said terminal will be crimped onto said wire.

4. An applicator as set forth in claim 3, said applicator having terminal clamping means for clamping said terminal on said anvil during movement of said anvil from said loading site to said crimping site.

5. An applicator as set forth in claim 4, said clamping means comprising a clamping arm which is movable with said anvil, said clamping arm being normally spaced from said anvil, and first camming means effective between said ram and said clamping arm for moving said clamping arm into engagement with said leading terminal concomitantly with severing of said leading terminal from said strip, said first camming means being effective to move said arm away from said anvil thereby to unclamp said leading terminal concomitantly with crimping of said terminal.

6. Apparatus as set forth in claim 5, having second camming means effective to actuate said shearing means.

7. Apparatus as set forth in claim 6 having closable wire clamping means adjacent to said crimping site, and means for closing said wire clamping means into clamping engagement with said wire prior to arrival of said anvil at said crimping site.

* * * * *